Jan. 5, 1937. E. H. UNKLES 2,066,435
IMAGE FORMING SYSTEM
Original Filed March 12, 1930  3 Sheets-Sheet 3
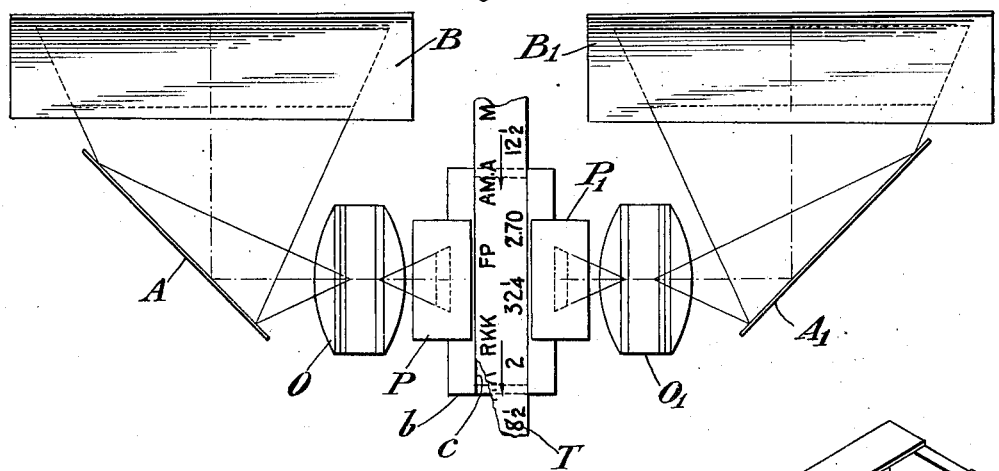
Fig. 3.
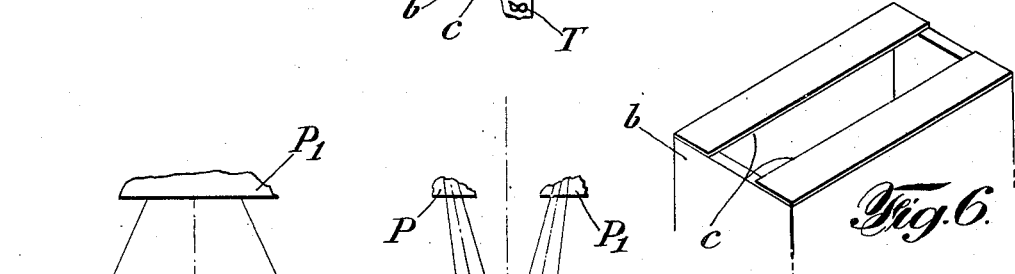
Fig. 6.
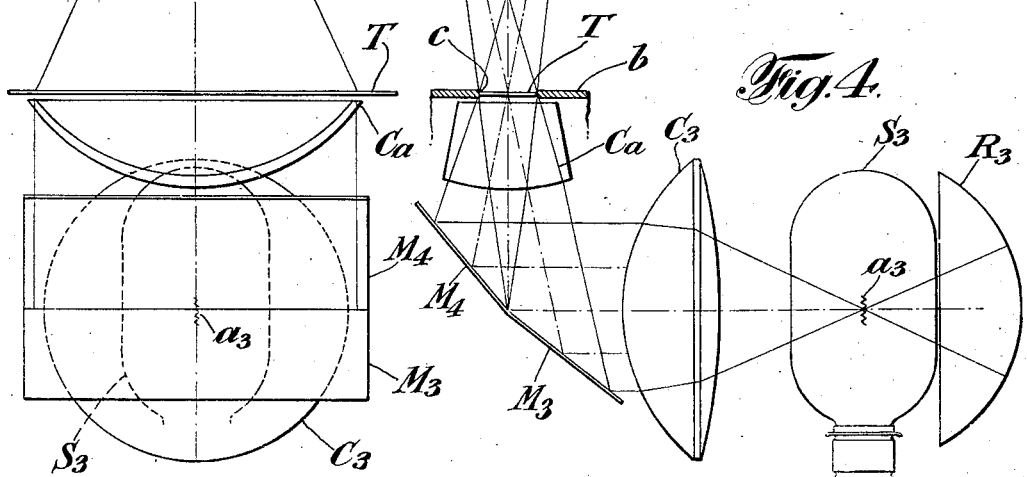
Fig. 4.
Fig. 5.
INVENTOR
Edward H. Unkles
BY
Ward, Crosby & Neal
ATTORNEYS Patented Jan. 5, 1937

2,066,435

UNITED STATES PATENT OFFICE 2,066,435

IMAGE-FORMING SYSTEM

Edward H. Unkles, Weehawken, N. J., assignor to Trans-Lux Daylight Picture Screen Corporation, New York, N. Y., a corporation of Delaware Application March 12, 1930, Serial No. 435,155
Renewed October 26, 1935

7 Claims. (Cl. 88—24)

My invention relates to a system utilizable for obtaining images of any suitable characters or representations borne by a tape or the like.

My invention relates particularly to a system wherein a plurality of images of the same tape-borne character or representation are simultaneously obtained or produced.

Various other advantages, objects and characteristics of my invention will become apparent from the following description taken in connection with the accompanying drawings.

For an understanding of my invention and for an illustration of some of the many forms thereof, reference is to be had to the accompanying drawings, in which:

Fig. 3 is a plan view, partly broken away, of a part of the system shown in Figs. 1 and 2;

Fig. 4 is a diagrammatic view showing another form of image-forming system as constructed in accordance with my invention;

Fig. 5 is a side view of the system shown in Fig. 4; and

Fig. 6 is a perspective view of a tape support.

In general, my invention relates to a system for simultaneously obtaining a plurality of images of the same character or same group of characters. These images may be thrown, by suitable mirror systems, onto different screens suitably disposed so as to be within the viewing range of different groups of people.

Figure 1:
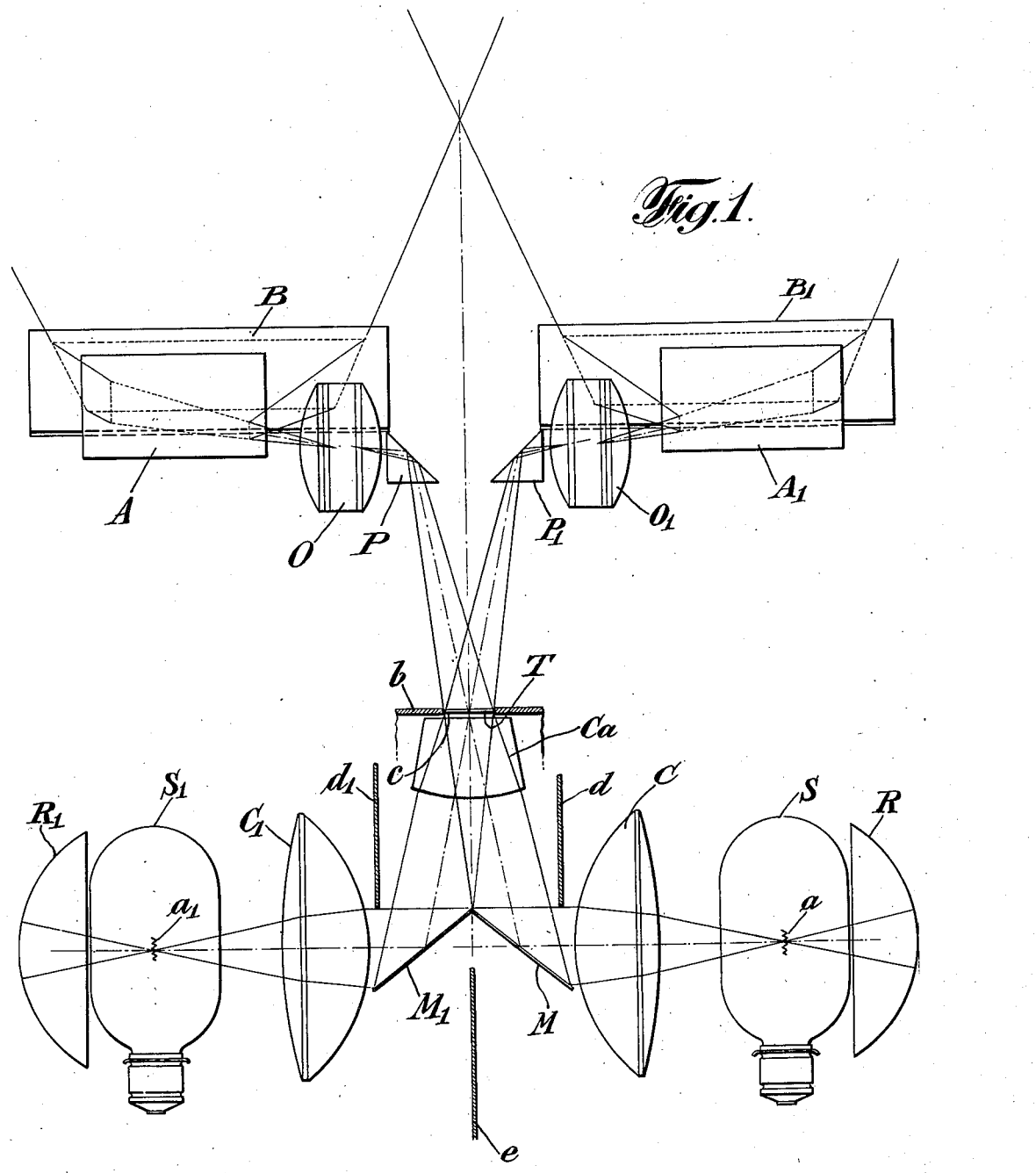
Fig. 1 is a diagrammatic view of an image-forming system constructed in accordance with my invention.
Figure 2:
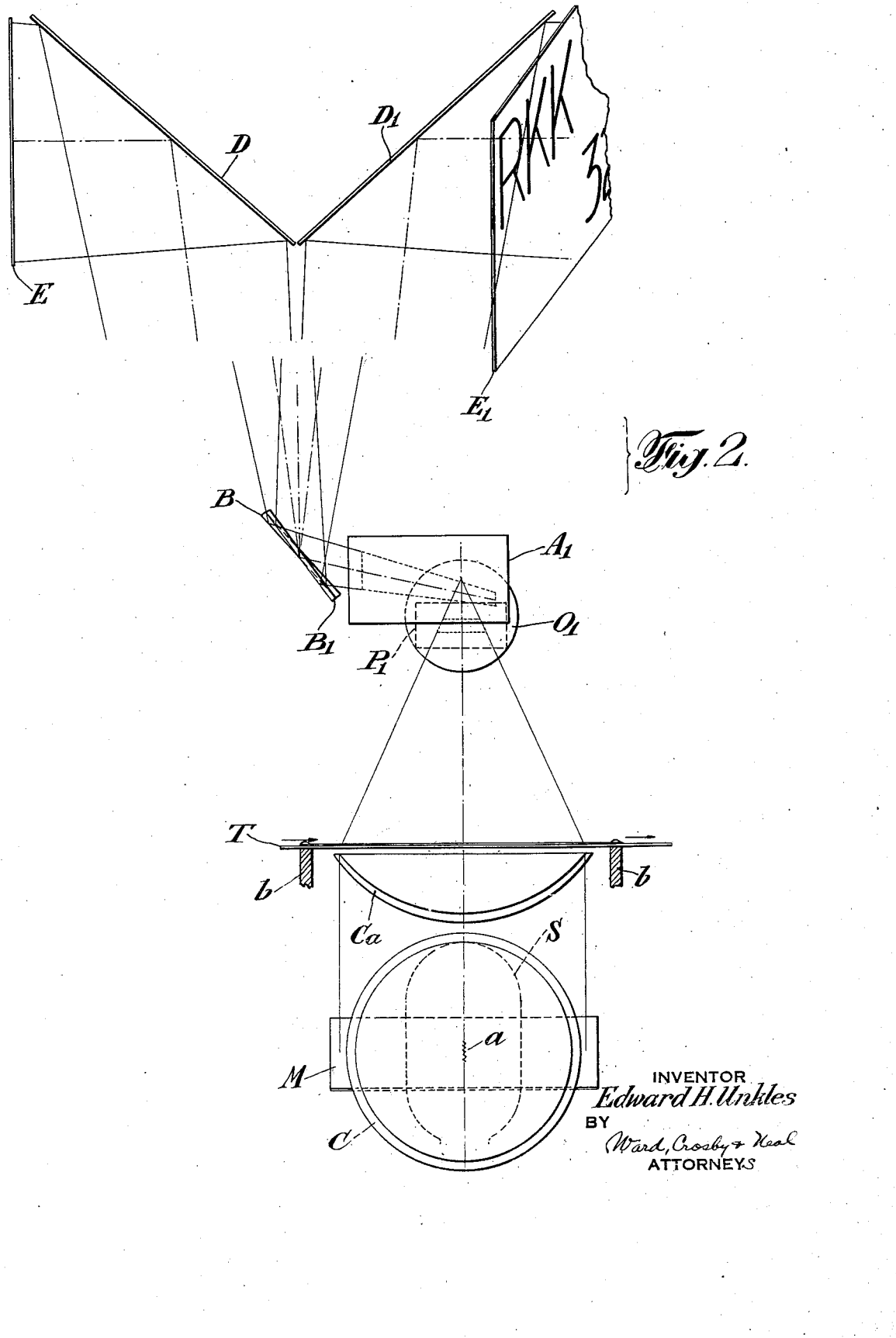
Fig. 2 is a side view of the system shown in Fig. 1.

Referring to Figs. 1, 2, and 3, S represents any suitable source of light such, for example, as a lamp bulb having a filament $a$ adapted to be brought to incandescence. A suitable reflector R may be associated with the light source S and cooperates therewith to produce light of great intensity which, as a beam of light, traverses any suitable condensing lens system herein shown as comprising the spaced condensing lenses C and $Ca$.

In the form of my invention herein illustrated, although not necessarily, a suitable light-reflecting surface, as an ordinary plane mirror M, is disposed between the condensing lenses C and $Ca$ to change the direction taken by the light beam after passage thereof through the condensing lens C.

After leaving the condensing lens $Ca$, the light beam generated by the light source S passes through any suitable representation-bearing surface which, in the form of my invention herein shown, is a transparent or semi-transparent "ticker" tape T such as issues from stock "ticker" mechanism of any suitable type after characters indicative of stock quotations have been printed thereon. The tape T, under the influence of any suitable mechanism, not shown, is moved under tension transversely of the path taken by the aforesaid light beam after emergence thereof from the condenser lens $Ca$. During such movement, the tape T is supported by any suitable frame or member $b$ having an elongated slot $c$, Figs. 3 and 6, forming the picture aperture or projection field.

After traversing the tape T, the light beam coacts, preferably but not necessarily, with any suitable light-reflecting surface herein shown as a prism P and then with a suitable projection or objective lens O. Upon leaving the objective lens O, the diverging light beam may coact successively with the elements of any suitable light-reflecting system and then with a suitable screen whereby images are exhibited of the characters formed on the tape T by the "ticker" mechanism, a light-reflecting system suitable for this purpose being claimed in the copending Bowen application Serial No. 455,195, filed May 24, 1930.

One of the many suitable forms of such light-reflecting systems is herein illustrated as comprising a mirror A with which the light beam coacts after leaving the objective lens O. By the mirror A, the light beam is deflected toward and into coacting relation with a mirror B by which said light beam is deflected to a mirror D, Fig. 2, and thence to a screen E of the character utilized, in the example shown, in "rear" projection or projection of that character wherein the light beam passes through the screen to reach one or more persons viewing said screen.

In the form of my invention herein illustrated, although not necessarily, the frame $b$ is substantially horizontally disposed to cause similar disposition of the tape section during projection thereof. Further, as illustrated, although not necessarily, the light beam passes upwardly through the tape T, the prism P changing the course of the light beam so as to bring it much nearer a horizontal direction. After leaving the objective lens O, the mirror A deflects the light beam substantially in a horizontal direction, if desired, so as to cause coaction thereof with the mirror B which again directs the light beam upwardly to the mirror D, the latter causing said light beam to coact with the screen E.

Accordingly, for any given position of the tape

T, there are obtained on the screen E images of those characters on said tape T which are defined by or within the enclosure of the frame b. As the tape T moves, the characters thereon enter the frame b at one end thereof, move thereacross, and leave at the other end thereof. As a result, the character images move across the screen E in correspondence with the tape movement, said images appearing at one end of said screen E, moving thereacross, and leaving at the other end thereof.

In accordance with my invention, a plurality of images are simultaneously obtained of any given character on the tape T and these images may be viewed on screens or the like disposed in any suitable position as desired. As one of the many arrangements suitable for accomplishing the function just stated, I have shown in Figs. 1, 2, and 3, a second image-forming and light-reflecting system similar to the one hereinbefore described, the different parts of said second system bearing reference characters the same as the corresponding parts of the first described system with the numeral "1" appended in each case.

As illustrated, but not necessarily, the two image-forming systems are symmetrically disposed in the sense that the axes of the light beams emanating directly from the respective light sources S and S1 may be defined by the same straight line, said light beams passing toward each other and being intercepted by the respective mirrors M and M1. By the latter, the aforesaid light beams are deflected upwardly and traverse the common condenser lens Ca whereupon both light beams simultaneously pass through the same section of the tape T.

As clearly appears from Fig. 1, the mirrors M and M1 are so positioned that the respective light beams cross and, in angular relation with respect to each other, pass to the respective prisms P and P1. From the latter, the light beams traverse the respective objective lenses O and O1 after which they engage the mirrors A, A1, respectively, and then the respective mirrors B, B1.

As shown in Figs. 1 and 3, the mirrors B and B1 are disposed in spaced, side-by-side relation and, as shown in Fig. 2, said mirrors B and B1 are inclined to different degrees with respect to a horizontal plane. This arrangement is provided so as to cause the light beams to be angularly related to a desired degree after they leave the respective mirrors B and B1 whereby they pass upwardly in non-interfering relation and engage the respective mirrors D and D1. By the latter, the respective light beams are deflected in opposite directions, although this may be varied, if desired, to bring them into coaction, respectively, with the oppositely facing screens E and E1 which, ordinarily, are vertically disposed.

On each of the screens E and E1, there simultaneously appears, in accordance with my invention, an image of each character on the tape T within the part thereof defined by the frame b and these images move across each screen, respectively, in correspondence with the tape movement.

Thus, on each screen E and E1, there simultaneously appears duplicate images of each character on that part of the tape T defined by the aperture c of frame b. The screens E and E1 may be positioned as desired for observation of the images thereon. As shown, although not necessarily, said screens face in opposite directions or are disposed in back-to-back relation and, therefore, a person observing the screen E, for example, is not in a position for direct observation of the screen E1. An arrangement such as just described is adapted particularly for use in stock brokers' offices where the screens E and E1 face into or are disposed in opposite rooms in which case, the light beam coacting with one of the screens may pass through a wall separating the rooms. However, it shall be understood that the invention is not to be limited to the screen arrangement described above or to any particular screen arrangement since the screens may be disposed or grouped in any suitable manner for observation as desired.

Where the screens are disposed in back-to-back relation, the two reflecting systems may be duplicates, symmetrically arranged, although this is not necessary. With such an arrangement, the two objective lenses O and O1 may have equal focal lengths and may be so focussed that the lengths of each light path, from tape to screen, are equal to thereby obtain image area on each screen of the same extent. However, if desired, the lengths of such light paths may be unequal and this relation may be attained by differently focussing the objective lenses O and O1. Where the relation last mentioned obtains, objective lenses of different focal lengths are required if the image area on each screen is to be of the same extent.

If desired and as stated, the screens need not be disposed in back-to-back relation; for example, they may be arranged at right angles to each other or otherwise as desired. Under such circumstances, ordinarily, the reflecting systems are not duplicates.

As herein illustrated, the light beams as they pass through the objective lenses O and O1, respectively, are not concentric with the respective center lines thereof. Obviously, the arrangement may be such that concentric relation is attained if desired.

With a light beam projecting arrangement of the character illustrated in Fig. 1, a suitable shielding arrangement should be employed to restrict or define the paths for the light beams from the respective light sources. In the example shown, such shielding arrangement comprises a plurality of light-opaque members d, d1, and e corresponding in length with that of the mirrors M, M1. As illustrated, the member d is so positioned that the lower surface thereof is in alinement with the upper surface of mirror M1 whereas the upper surface of said member d extends at least as far as the lower surface of the condensing lens Ca. Accordingly, the member d so restricts the light path that such light as comes within the region between the mirror M and the condensing lens Ca is that which is reflected by said mirror M. The member d1 functions in a manner similar to that just described with respect to the member d and, therefore, defines the upper edge of the path taken by light emerging from the source S1. The member e is adapted to intercept light which would otherwise pass in either direction below the mirrors M, M1. Accordingly, the upper surface of member e should be disposed at least as high as the lower surface of either of said last named mirrors and said member e should extend a suitable distance below the mirrors.

In the form of my invention hereinbefore described, each light beam is generated or produced by an individual light source. My invention is not to be restricted to an arrangement of this character since many other arrangements may be utilized, for example, as illustrated in Figs. 4 and 5, wherein a plurality of light beams are obtained from a single light source S2 which, if desired, may correspond with the hereinbefore described light sources S and S1, and has, therefore, a filament a3 adapted to be brought to incandescence. A reflector R3 may be associated with the light source S3, light from both traversing a suitable condensing lens C3 and then coacting with a suitable reflecting surface, as the angularly related mirrors M3 and M4. The latter cause the development of independent light beams which traverse the condensing lens Ca and a section of the tape T which may be supported the same as hereinbefore described on a frame b having an elongated aperture c. From the tape T, the light beams traverse any suitable reflecting system and coact with any suitable screens such as heretofore illustrated, for example.

With the form of my invention illustrated in Figs. 1, 2, and 3, the condensing lens system comprises condensing lenses C and C1 associated with the respective light sources S and S1 and a condensing lens Ca common to both light sources. As shown in Figs. 4 and 5, the arrangement is somewhat different because the condensing lenses C3 and Ca are common to a single light source, each of said last named lenses being traversed by all of the light which is segregated into the two independent light beams. The condensing lens systems thus illustrated are typical of some of the many suitable forms of such systems that may be utilized. The same is true of the light beam reflecting system which, obviously may be of any suitable character.

While my invention has been described in connection with ordinary "ticker" tape, it shall be understood that any suitable surface or member may be utilized in lieu thereof, and that such "ticker" tape, member or surface may bear or have printed thereon any suitable indicia, representations, characters, or the like, hereafter in the appended claims generically termed a "character" or "characters".

Ordinarily the projection is of the "through" type, i. e. that type wherein the light passes through the transparent or semi-transparent tape or other surface. If desired, however, such tape or surface may be of the reflecting type in which case the light passes along its intended path after reflection from said last named tape or surface.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a system of the character described, a projection field with respect to which is movable a tape having characters reading lengthwise thereof, means for simultaneously passing a plurality of angularly related light beams through the same section of said tape as it moves along its path, and an objective lens in the path of each light beam, each objective lens producing images of the tape characters which move substantially horizontally in an image plane and the image planes being spaced from each other and facing in different directions.

2. In a system of the character described, a projection field with respect to which is horizontally movable a tape disposed flatwise and having characters reading lengthwise thereof, light-emitting means disposed below said tape, reflector means for directing a plurality of angularly related light beams upwardly through the same section of said tape as it moves along its path, and an objective lens in the path of each light beam, each objective lens producing images of the tape characters which move substantially horizontally in an image plane and the image planes being spaced from each other and facing in different directions.

3. The combination with a common source of light, of means including a reflector and light converging condensers for cooperating with said source of light to produce a main beam of parallel light rays, a single light aperture, two light deflectors disposed at an angle to one another, one of said deflectors being disposed between said light source and the other deflector, each light deflector disposed in the path of one-half of said main light beam thereby to project two subordinate light beams at an angle to one another at said light aperture, a master disposed at said light aperture, a screen for each of said subordinate light beams, and means including objective lens units for directing the image impressed subordinate light beams onto said screens.

4. The combination with a common source of light, of means including a reflector and light converging condensers for cooperating with said source of light to produce a main beam of parallel light rays, a single light aperture, a master disposed at said light aperture, a light converging condenser adjacent to and in advance of said light aperture to converge the image impressed light rays passing from said light aperture, two light deflectors disposed at an angle to one another and to said light aperture to divide said main light beam into two subordinate light beams to project them at an angle to one another through the master disposed at said light aperture to produce two image impressed subordinate light beams, one of said deflectors being disposed between said light source and the other deflector, a screen for each image impressed subordinate light beam, and means including an objective lens unit for directing each subordinate light beam to one of said screens.

5. The combination with a common source of light, of light converging means cooperating with said source of light to produce a main beam of substantially parallel light rays, a single light aperture, a master disposed at said light aperture, a plurality of light deflectors inclined to one another and to said light aperture to divide said main light beam into a plurality of subordinate light beams and project them inclined to one another through the master disposed at said light aperture to produce a plurality of image impressed subordinate light beams, one of said deflectors being disposed between said light source and the other deflector, a screen for each image impressed subordinate light beam, and means for directing each image impressed light beam to one of said screens.

6. The combination with a common source of light, of light converging means cooperating with said source of light to produce a main beam of parallel light rays, a single light aperture, a master disposed at said light aperture, means for splitting said main light beam into two subordinate light beams and projecting them at an angle to one another through the master disposed at said light aperture to produce two diverging image impressed subordinate light beams, a screen for each image impressed subordinate light beam, and means for directing each image impressed subordinate light beam to one of said screens.

7. The method of simultaneously projecting onto two screens facing in opposite directions the images of the markings on a narrow tape consisting in producing a main beam of parallel light rays, dividing the main beam into two subordinate light beams and deflecting such subordinate beams at an angle to intersect one another, converging the subordinate light beams at their intersection and simultaneously impressing the converging subordinate light beams with images, then separately diverging each light impressed converging beam of light rays, and deflecting said subordinate beam of light rays so diverging into different directions onto separate screens.

EDWARD H. UNKLES.